Patented June 2, 1931

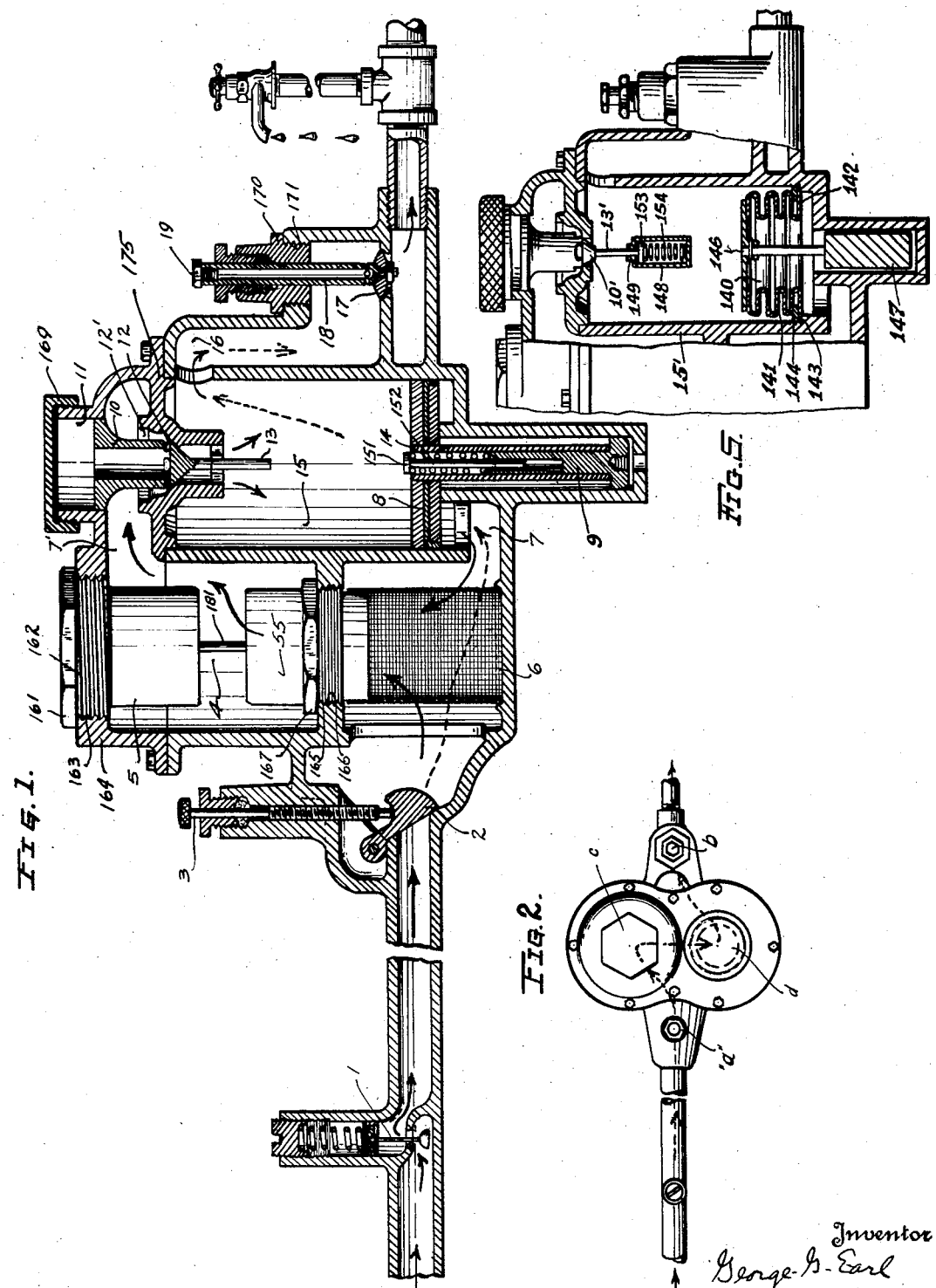

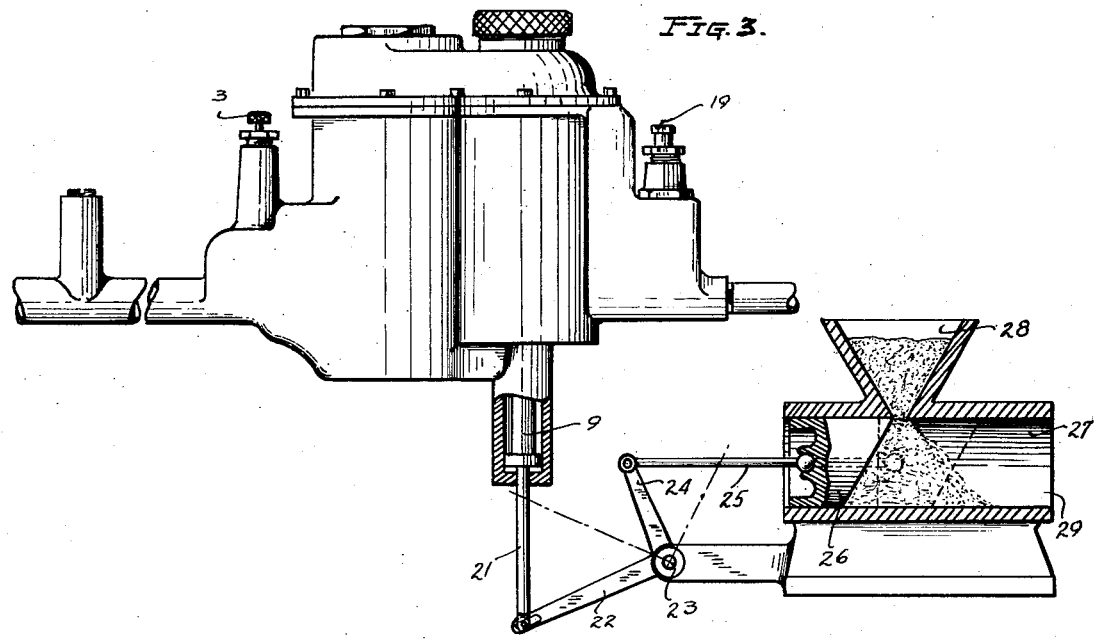
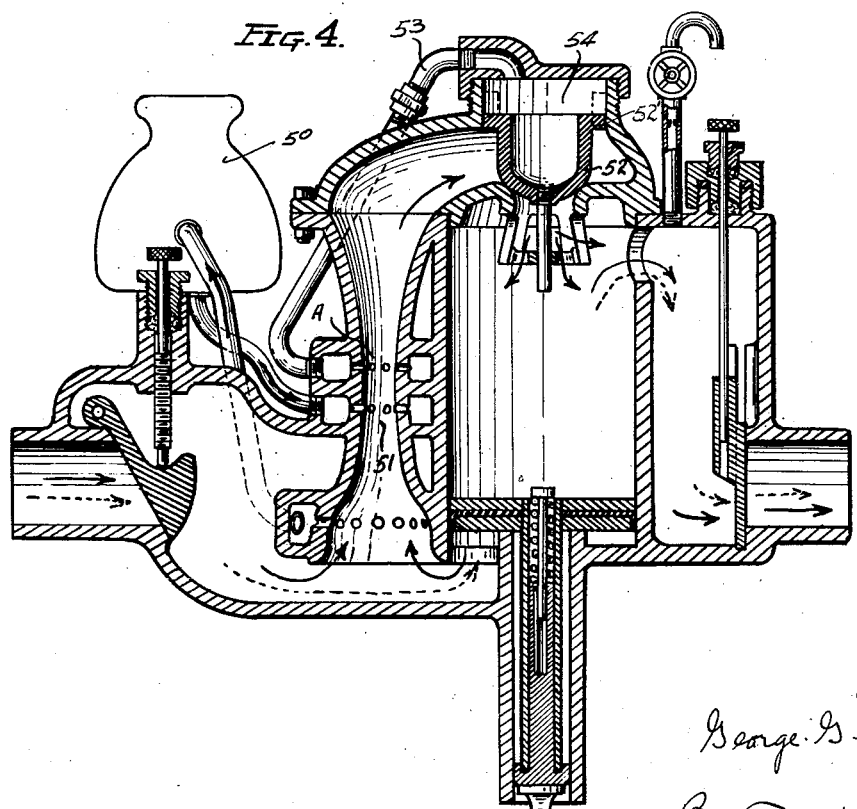

1,808,210

UNITED STATES PATENT OFFICE

GEORGE GOODELL EARL, OF NEW ORLEANS, LOUISIANA

FLUID METERING MECHANISM

Application filed May 31, 1927. Serial No. 195,275.

My invention relates to liquid meters and relates particularly to liquid flow registering meters of the water meter type commonly installed in residences to register the water taken from a central water system by individual consumers of the system, although my invention in all of its phases is not limited to such use.

The ordinary water meter is very inefficient in the registering of very small flows, and since a great proportion of the water passing a meter passes at a very low rate of flow, it naturally follows that where a charge is made against the consumer according to the registered drafts of water passed through the meter, if this registering is inaccurately done, a very serious loss to the interests supplying the water will occur, this being particularly true since the water meters almost always register less than the actual flows where the rate of flow is low. Moreover, it is found that when the drain from the system at water consuming points is accomplished at a sufficiently low rate, which condition is had in a large proportion of cases, due to leaks past defective faucets, and the like, very often such flows are so slight as not to be registered at all.

It has been found that most water connections have at least 10 gallons per day of small unregistered flows, including the waste flows, and with the ordinary water meter there is no possibility of measuring such small rates of flow. A constant waste of $\frac{1}{16}$ gallon per minute will not be registered at all on the ordinary existing type of so-called "⅝ inch" meters, and would aggregate a value, at a rate of 10¢ per 1,000 gallons, approximately $3.29 per year. And in addition to this waste is the further waste at each consuming connection due to insufficiently registering small flows. So that for average conditions it has been computed that the loss on such a meter will run at least $13.16 per year.

When one considers that the ordinary charge, based on registering flows in large cities, only averages approximately $65.00 per year, it is evident that if a water meter would register the entire flow passing through it, at least 20% will be added to the registered flows even where the more efficient types of ⅝ inch water meters are used, and that this saving will be increased enormously where larger, more inefficient meters are employed where small unregistered or only partial registered flows are had.

Another item of considerable cost had in connection with the operation of a municipal water system is that of meter maintenance. In a representative large city it is found that it costs about $5.00 to remove, overhaul, test and restore a ⅝ inch meter to service, it being generally considered that this should be done about every five years. Due to the impossibility of properly testing these meters in place at the consuming point, they must be removed to the central station, and a substitute meter installed on the premises. Twice as many meters as are actually found defective must be removed, tested and replaced. The cost is thus doubled and, in addition, the consumer has no faith in the testing of his water meter where it is done at the central station and away from the premises.

In the ordinary meter construction it has been found difficult and expensive to locate and replace defective parts, and, in addition, certain adjuncts to a water meter being separately installed involve separate installation, maintenance and replacement costs.

An object of my invention, therefore, is to provide a water meter of what I term the "gulper" type, which will efficiently register the entire flow of water withdrawn from the system through the meter, whether such draft is had at a high or an infinitesimally low rate.

Another object of my invention is to provide a meter of the "gulper" type which will be capable of being inexpensively manufactured and which will operate efficiently in use for long periods of time with little or no attention.

Another object of my invention is to provide a meter mechanism which may be readily tested on the premises without severing it from its connections, simply and expeditiously, and, at the same time, in an accurate manner.

Another object of my invention is to provide a meter in which the operating parts are made accessible and capable of ready removal and replacement without removing the meter from its normal connections.

Another object of my invention is to provide a meter in which the meter proper and the associated accessory parts are combined in an integral unitary structure, thus effecting an economy in the total cost of producing the totality of the meter and related accessory parts.

Another object of my invention is to accomplish the utilization of the ordinary meter registering mechanism in an environment providing for the operation thereof only under relatively high flow conditions at which the mechanism will most efficiently operate, and dispensing the flow at whatever rates of flow are required by the system; in other words, for small rates of flow, effecting the supplying through the meter in "gulps", and then on the discharge side of the meter permitting the draft at the demand rates.

Another object of my invention is to provide for the registering of all flows passing the meter by a motor mechanism accomplishing the dispensing "gulping" action.

Another object of my invention is to provide for the operation of an auxiliary mechanism, such as a dispensing device for dispensing a granular or powdered chemical in quantities commensurable to the rate of flow passing the meter by power means derived from the movable element of the gulper mechanism of a so-called "gulper" meter.

Another object of my invention is to provide a gulper meter mechanism as a unitary piece of apparatus and comprising the meter and gulper mechanism in a form adaptable for installation in the same fitting and in the same way as had for meters now commonly used.

Other objects of my invention and the invention itself will become apparent by reference to the following description of certain embodiments of my invention and which embodiments are illustrated in the accompanying drawings in which Fig. 1 illustrates an embodiment of my invention in sectional view;

Fig. 2 is a plan view of a modified relative arrangement of the parts of the apparatus of Fig. 1;

Fig. 3 is a view of the embodiment of Fig. 1 in side elevational view, with additional mechanism applied thereto and operable thereby;

Fig. 4 illustrates mostly in section another embodiment of my invention and which illustrates also an adaptation thereof for registering larger flows by the utilization of the proportional flow meter principle in connection therewith;

Fig. 5 illustrates another embodiment of my invention.

Referring first to the embodiment of my invention illustrated in Figs. 1 and 2, I first identify the different parts illustrated therein by reference characters as follows:

At 1 is shown a valve adapted to maintain an approximately constant pressure approaching the gulper which may be used to advantage in certain embodiments.

At 2 is shown a weighted check valve which can be used if desired to prevent flow from passing backward through the meter.

At 3 is shown a valve stem by which the valve 2 can be clamped shut if desired, thereby preventing any flow toward the gulper.

At 4 is shown a meter of any form through which all flow passing in the direction indicated by the arrows must pass.

At 5 is shown the counter which is suitably connected with the movable member in meter 4 to integrate or register the flow through it.

At 6 is shown a screen to protect meter 4 against the entrance of trash.

At 7 is shown a passage-way to the higher pressure or power side of the gulper reservoir piston 8 connecting same with the approach side of meter 4.

At 7' is shown a passage-way from the discharge side of meter 4 to the valve 10 through which valve small flows can only escape by gulps to the reservoir side of the gulper piston 8.

At 8 is shown a piston, diaphragm or other movable water-tight division separating the power side from the reservoir side of the reservoir chamber 15.

At 9 is shown a differential piston whereby a difference of effective area is maintained on the two sides of the piston 8 to maintain a difference of pressure on the two sides thereof.

At 10 is shown a valve which in this adaptation closes in the direction of the flow.

At 11 is shown a cylindrical chamber somewhat larger in diameter than the passage-way which is closed by the valve 10 into which chamber an enlarged portion of the valve 10 extends with an easy fitting piston so that the pressure in the chamber 11 is kept substantially equal to the pressure which exists on the ports 12.

At 12 are shown ports or openings in the valve 10 consisting of openings all around the same and placed close to the plane of closure on the approach side thereof.

At 12' is shown an annular opening of suitable area so that any required velocity through the same will produce a sufficient decrease in pressure to prevent the valve 10 from closing by its own weight, or other applied force. This annular opening may be so shaped that greater and greater rates of flow will create this counter-balancing reduction of pressure at a higher and higher position of said valve.

At 13 is shown a guide and stem of the valve 10.

At 14 is shown a kicker spring which will be compressed when the piston 8 moves toward its low pressure side until said spring has accumulated enough energy to overcome the difference of pressure across the valve 10, and the weight of said valve or other force holding said valve closed whereupon said valve will be kicked open by the head 151 of the kicker rod 152, supported on the spring 14 assisted by the reduction in pressure created in chamber 11 due to the velocity of flow passing the opening 12 through the restricted annular space 12'.

At 15 is shown the reservoir chamber from which small drafts are supplied. No water can pass piston 8 and no water can pass valve 10 or meter 4 until the low pressure side of chamber 15 is exhausted to a point where the kicker spring 14 has opened the valve 10, and no rate of flow lower than that for which valve 10 is designed can pass said valve.

At 16 is shown an outlet passage from chamber 15.

At 17 is shown a valve which may be placed in said outlet passage-way whereby any flow beyond said valve may be prevented.

At 18 is shown a hollow stem for the valve 17.

At 19 is shown a plug at the end of the hollow stem 18. By closing valve 17 and attaching a draft tube in place of the plug 19, a small test flow can be withdrawn with the positive assurance that it is the only flow passing through the gulper, and meter if used. By drawing a small flow in this way, every part of the apparatus is tested. If the meter registers correctly everything is in order. If any trouble is found, valve 2 can be closed and every movable portion of the apparatus on the house side of valve 2 can be examined or renewed from the top without removing the lower case from the ground or disconnecting it from the pipe line in which it is laid.

Practically every meter which is installed has a cut-off valve placed before it on its approach side. In very many cases check valves are placed in the line to prevent hot water from being forced back through the meter or for other causes. It is also customary in some cities to install a shut-off valve on the discharge side of the meter with a plug or draw off connection on the meter side thereof from which a test flow may be taken at a registerable rate through the meter. It is also customary to install meters in boxes or yokes from which they can be easily removed as a whole for testing or repair without removing the boxes, yokes or valves above mentioned.

I have devised an arrangement whereby for any given nominal capacity rating of meter, within a space having the length of the standard meter of said rating and a width about equal to the said length and a height little if any greater than the height of said meter, I can build a gulper meter and include therein first, a check valve; second, a positive valve to cut off water from the approach side; third, a valve to cut off any escape of flow to the connection being supplied; and fourth, a method of drawing from the meter a test flow adequate to test every part of it and, in addition, I have arranged so that every portion of the works of said meter except the approach valve can be removed and renewed so easily from the top, that the necessity for the removal of the lower case will be less frequent and the necessity for the character of yoke or box designed for such frequent removal of said lower case will be greatly reduced.

With or without these valves, etc., just above mentioned, these gulper meters can be used in the same setting and in the same way as meters are now commonly used. They can in all cases pass as much flow with as little pressure absorption as is stipulated for capacity rate in existing standard meter specifications, registering said capacity flows well within the guaranteed limit of accuracy of said specifications, but instead of beginning to fall off in accuracy at from 1/10 to 1/20 of said capacity flows and registering possibly not over 90% at from 1/20 to 1/80 of said capacity rates of draft as per standard meter guarantee for simple meters, or having a lapse in accuracy of registration which may be below 97% (down to 85%) for a range of flows covering about 1/5 of their capacity flow, as indicated by existing standard guarantees for compound meters, these gulper meters will register without any lapse in accuracy of registration down to constant wastes which may be even far below 1/1500 of their capacity rate. In fact, the very first test of a gulper meter for seventeen hours on drops, registered 98% on less than 1/6000 of its capacity rate.

The general arrangement and disposal of parts herein outlined is shown in Fig. 1, this drawing showing the parts all in a line. The parts can be assembled in much more advantageous relation, for instance as in Fig. 2, "*a*" being the check and apprach valve, "*b*" being the cut-off valve from house and test flow plug, "*c*" the meter and integrator and register chamber and "*d*" the gulper piston and reservoir chamber.

The valve illustrated has the advantage that it is opened when the reservoir capacity is exhausted, and remains open, with the least possible pressure absorption across it, down to any required predetermined rate of flow through it regardless of the position of the reservoir piston and that it seats quietly, the instant the rate of flow through it falls below the rate at which it is intended to remain open.

For gulper meters for ordinary uses, I contemplate using this valve with a weight or spring or both to maintain the desired difference of pressure across the gulper piston and gulper valve, two or three pounds difference of said pressures being ample.

At these lower differences of pressure it is found that any form of valve in order to be promptly reliably and instantaneously opened as the exhaustion of the reservoir capacity progresses, must be subjected to an "accumulated energy" brought about preferably by the advance of the reservoir piston on its reservoir discharging stroke until a sufficient force has been accumulated capable of acting through a sufficient distance so that when once the force acting to hold the valve closed is overbalanced and the valve starts to open at all, the accumulated force will suffice to continue the opening motion.

There are, however, many uses other than simple metering to which the gulper may be applied. For instance, it is sometimes required that a meter shall function to operate other apparatus proportional to the flow through it. In order to do this there is a considerable resistance to flow through the meter requiring a much higher rate of flow through the meter and a far larger difference of pressure across the gulper piston and valve than simple registering requires. In such case a differential piston of 10%, 20% or even a larger percentage of the area of the main piston may be required, or poppet valve action dominated by the motion of the reservoir piston in both directions, may be found desirable.

A gulper meter of the type described can be made to act under a sufficient difference of pressure and at a high enough rate of flow during each gulp so that the meter can exert a great deal of power through an intermediate train to actuate apparatus correctly proportional to constant small rates of draft through the gulper which the meter alone could not even register.

There are other cases where a still larger amount of power needs to be applied proportional to a very small amount and rate of fluid flow. In such cases a gulper with or without a meter can act as a motor registering meter by direct connection from its reservoir piston stroke.

For instance, referring to Fig. 3 in connection with Fig. 1, suppose it is desired to feed a granular dry chemical to a water supply to be treated. The rod 21 communicates its motion from the piston 8 to the rocker arm 22, 24, pivoted at 23 and to rod 25, and the piston 26 moving in the piston chamber 27, forcing out an amount of matter dropped from hopper 28, proportional to the motion of said piston and discharging same as at 29. A flow of water can be produced proportional to said supply either automatically, which can be done by equal pressure diaphragm means, or by hand set rate, which flow at maximum rate will require, say, two minutes to exhaust the gulper reservoir. By sufficient pressure difference across the gulper piston, and by the use of a sufficiently large passage-way 7—7', which need not be obstructed by a meter, and by a sufficiently large valve 10 to refill said gulper reservoir the reservoir may be filled in two seconds. Two minutes is one hundred and twenty seconds for the reservoir emptying stroke during which time the chemical dispensing motion in one direction is proportional to the discharge; then for two seconds there is the same rate of discharge and no corresponding dispensing motion. The discharging stroke dispensing motion, therefore, only lacks 1⅔% of being proportional to the total flow; this would be the maximum error and is negligible, moreover it is a predetermined error which can be allowed for if in any particular case it becomes material.

In most cases a high and constant approach pressure is available, and a large enough percent of area of differential piston 9 and a large enough reservoir piston 8 may be provided to give plenty of power in both directions.

It is not in this case essential that the gulper stroke be of constant length, though with uniform approach pressure it would be substantially so.

If the difference of pressure across the gulper valve and piston, when the valve opens is not always the same, it is obvious that the valve would open at different amounts of compression of the "kicker" spring 14, or its equivalent. If the force creating this pressure difference, is a weight or a spring, the difference of pressure at which the gulper valve will open, will always be the same, and the length of stroke will, therefore, be constant.

There may be cases, however, where more power is required in one or both directions than can be conveniently arranged for by the use of a weight or spring and where there is an extremely variable approach pressure.

In such cases, by providing a valve, Fig. 1, on the approach side of the gulper to reduce the pressure approaching it to substantially a constant pressure as low as will at any time be required to work with, and by designing the piston and differential piston in the proper relation to give the amount of power required, it will still be possible to attain substantially a constant length of stroke and thereby cause actuation of an auxiliary device such as is illustrated in Fig. 3 in proportion to rates of draft through the gulper no matter how small said rates of draft may be.

A gulper meter normally reduces low rates of flow to gulps of flow at registerable rates and may cease to gulp entirely after the rate of draft has passed a registerable or safe operating rate for the meter as a continuous flow therethrough, at higher rates of flow, therefore the motion of the gulper piston ceases to bear any close relation to the flow passed and even ceases gulping entirely as the flow increases.

For use as a motor meter to actuate apparatus proportional to small rates of draft, the actual metering of the flow passing may be included or omitted and there is a definite limit to the maximum rate of draft which can be used, with a corresponding definite limit to the percentage of error due to said maximum rate of draft, but there is the advantage of slow continuous motion, with any desired amount of power behind it, down to mere driblets of rate of draft, proportional to said draft which will have a maximum definite percentage of error, as low as it may be necessary to provide for at maximum draft, and a decreasing percentage of error as the draft rate is decreased.

Fig. 4 shows a gulper proportional flow meter wherein a very small meter 50 measuring the flow from the approach to the throat of a restriction 51 in the main flow suffices for the registering of said main flow so long as the rate of passage of the main flow is not allowed to fall below a certain critical velocity in said restriction.

The valve 52 in such case can be dominated by the velocity in or near the restriction of the main flow, say, at A, because I have an effective "recovery of pressure member" and will have regained a material part of the pressure reduction due to velocity at A to act under piston 52' against the reduced pressure due to said velocity carried through the passage 53 and acting over said piston thereby obtaining the necessary decrease in pressure in chamber 54 to hold the valve positively open so long as the required velocity exists at A. I may use a valve operated as shown in Fig. 1, in such proportional flow meters or a valve as shown in Fig. 4, or I may use any one of several other forms of valve opening either with or against the flow for various embodiments to dominate the opening to be closed by valve 10 in Fig. 1. The form shown in Fig. 4 is especially designed to give the widest possible opening of the valve and the least resistance through it throughout the entire range of flow at which it is desired to hold the valve open at all.

In Fig. 1, the velocity in the portion of the passageway which dominates the valve 10 is the velocity opposite the openings 12, which will seek to move up or down to that point where the velocity of flow passing creates a balancing pressure in chamber 11.

If, say, 8 feet per second is the critical velocity which creates a balancing pressure in chamber 11, then valve 10 cannot move down to its seat through the restricted area while fluid at more than 8 feet velocity is passing the openings 12 in any position. If fluid at still more velocity is passing the openings 12, then the valve will be drawn up farther and will hold itself in said higher position so long as the velocity past the openings 12 exceeds said critical velocity. Obviously, area and form of the passage-way through which the openings 12 must advance as the valve closes or retreats as it opens, the weight of the valve (or other force tending to close it) and the relative area of the section closed by the valve and of chamber 11 in which the pressure dominates the motion of the valve in closing, all admit of vast variation in design to attain the most desirable characteristics for operation to meet any given requirement.

It will be seen that I have, therefore, provided a meter, having therein a valve which prevents small flows through the meter, in combination with a reservoir capacity adapted to supply small rates of draft to the system, and a movable member, herein illustrated in the form of a piston 8, Fig. 1, which is responsive to differential pressures on its two sides, namely, on its one side the pressure approaching the meter, and on its other side the pressure after the fluid has passed the meter and valve, said movable member adapted to open the valve to renew the supply in the reservoir whenever a predetermined difference of pressure exists on the two sides of the movable member.

Wherever, due to the particular conditions to be met, difficulty is had because of leakage or wear or objectionable resistance to the motion of the piston illustrated in the different figures of drawing described, I contemplate substituting for this piston, as 8, a bellows diaphragm or a flat diaphragm, and in Fig. 5, I have illustrated a fragment of the apparatus with a bellows diaphragm incorporated therein.

Referring to Fig. 5, which will be understood to illustrate a fragment of apparatus otherwise the same as in Fig. 1, except for the piston 8 of Fig. 1, I employ a bellows diaphragm 140 having preferably corrugated side walls 141 and a laterally extending flange 142, the flange 142 being rigidly secured to an interiorly extending flange 143 of the cylinder walls 15' by a ring 144 between which and the flange 143 the bellows flange 142 is clamped. The end wall 145 is reinforced by a plate 146 from which a weight 147 is suspended.

The weight 147 will be of such weight as to cause the diaphragm end wall 145 to tend towards its lowermost illustrated position but may be overpowered by a sufficient excess of pressure on the underside of the end wall over the pressure existing in the reservoir cylinder above the end wall, and generally is intended to perform substantially the same function as that performed by the differential piston 9, Fig. 1.

In Fig. 5, it will be noted that for the spring-pressed kicker rod 152 of Fig. 1, I have substituted a similar arrangement comprising a cylindrical element 148 telescoped over the end of the depending stem 13' of the valve 10'. The element 148 has a perforated end wall 149 adapted to engage the outwardly extending end flange 153 of the valve stem 13' by virtue of its own weight and the pressure of the compression spring 154. The action of the kicker element 148, of Fig. 5, is the same as that of the kicker rod 152, Fig. 1, being an obvious modification which may be made in any of the illustrated forms of my improved meter mechanism.

It is believed that with the above explanation, the modification contemplated and indicated in Fig. 5 will be readily understood.

It will be seen also that the meter counter mechanism 5 is contained in a cylindrical case which has a hexagon head 161 by virtue of which it may be turned to effect engagement or disengagement between its exteriorly threaded portion 162 and the internally threaded aperture 163 of the casing wall 164 in which the entire mechanism is housed. The impeller element likewise is contained in a housing 55 and similarly screw-threaded at 165 into an internally threaded apertured web 166 of the casing. A hexagon 167 is provided to securely screw the meter impeller mechanism 55 in its place on the web 166. It will be seen that both the counter mechanism casing 5 and the meter impelling casing 55 are of reduced diameter in their non-exteriorly threaded portions, so that both may be removed readily through the aperture 163 at the top of the casing. Suitable means, such as the shaft 181, is provided to communicate movements of the water flow responsive apparatus contained in the casing 55 to the counting mechanism contained in the casing 5. The diameter of the threaded portion of the impeller casing will preferably be made sufficiently less than the diameter of the aperture 163 so that when the impeller casing is removed from its mounting web, it may then be readily removed from the meter mechanism casing through the aperture 163.

Similarly, the cylindrical screen 6 disposed below the impeller casing may be withdrawn through the aligned threaded openings in the web 166 and a casing upper wall 164, being of smaller diameter than such apertures. A threaded cap 169 is provided for the threaded end of the chamber 11 and when removed permits ready removal of the valve 10. Similarly, the outlet valve 17 may be removed as a unit by unscrewing the flanged mount 170 which carries it from the threaded aperture 171 of the casing wall.

Should replacement or inspection of the piston 8, or the related parts, be required, this may be accomplished by removal of the head 175 of the meter mechanism casing. It will thus be seen that the various cooperating parts of the meter mechanism may be readily removed or replaced without removing the meter casing from the fittings where the meter is installed, and that suitable inlet and outlet valves are provided so that the water may be shut off during inspection and repair of the meter.

In the embodiments of my invention illustrated and described herein, the valve such as 10 or 52 is normally biased to a closed position by its weight or by the action of gravity thereon. Also the piston 8 is similarly held downwardly by the action of gravity. Other suitable means well known in the art, such for example as a spring, may be substituted for gravity to bias the valve and/or the piston, and all such means are comprehended in the biasing "means" of the claims.

Having thus described my invention in certain specific embodiments I am aware that numerous and extensive departures may be made from the embodiments herein illustrated and described without departing from the spirit of my invention.

I claim:

1. In a hydraulic system, in combination a container for liquid, a wall for said container movable inwardly and outwardly upon movement of liquid into and from the container, means to continuously communicate pressure of liquid from a source to the exterior side of said wall, means to continuously effect a predetermined pressure of constant value upon the wall to oppose the pressure of liquid effective on its exterior side, a valve operable to admit liquid from the source to the interior of said container, said valve and said wall being normally, entirely, operatively disassociated, means responsive to a definite predetermined outward movement of the wall to operate the valve, and a duct for discharge of liquid from the container.

2. In a hydraulic system, in combination a container for liquid, a wall for said container movable inwardly and outwardly upon movement of liquid into and from the container, means to continuously communicate pressure of liquid from a source to the exterior side of said wall, means to continuously effect a predetermined pressure of constant value upon the wall to oppose the pressure of liquid effective on its exterior side, a valve operable to admit liquid from the source to the interior of said container, said valve and said wall being normally, entirely, operatively disassociated, means responsive to a definite predetermined outward movement of the wall to operate the valve, a duct for discharge of liquid from the container, a source of other material than liquid from said first-named source, means adapted when operated to effect dispensing of a predetermined amount of such material from its source, and means responsive to each cycle of movement of said wall adapted to effect an operation of said dispensing means.

3. In a hydraulic system, in combination a container for liquid, a wall for said container movable inwardly and outwardly upon movement of liquid into and from the container, means to continuously communicate pressure of liquid from a source to the exterior side of said wall, means to continuously effect a predetermined pressure of constant value upon the wall to oppose the pressure of liquid effective on its exterior side, a valve operable to admit liquid from the source to the interior of said container, said valve and said wall being normally, entirely, operatively disassociated, means responsive to a definite predetermined outward movement of the wall to operate the valve, a duct for discharge of liquid from the container, a second container, a movable wall therefor, the interior of said second container communicating with a point in the flow of liquid passing said valve, which is so restricted as to effect a loss of pressure at such point commensurable with the velocity of flow passing the point, the exterior side of said wall communicating with a less restricted point in the path of the flow passing the valve, and means effective upon an inward movement of the second container wall to maintain the valve in operated position so long as the velocity of flow passing thereto is more than a predetermined velocity.

4. In a hydraulic system, in combination a container for liquid, a wall for said container movable inwardly and outwardly upon movement of liquid into and from the container, means to continuously communicate pressure of liquid from a source to the exterior side of said wall, means to continuously effect a predetermined pressure of constant value upon the wall to oppose the pressure of liquid effective on its exterior side, a valve operable to admit liquid from the source to the interior of said container, said valve and said wall being normally, entirely, operatively disassociated, means responsive to a definite predetermined outward movement of the wall to operate the valve, a duct for discharge of liquid from the container, a second container, a movable wall therefor, the interior of said second container communicating with a point in the flow of liquid passing said valve, which is so restricted as to effect a loss of pressure at such point commensurable with the velocity of flow passing the point, the exterior side of said wall communicating with a less restricted point in the path of the flow passing the valve, and means effective upon an inward movement of the second container wall to maintain the valve in operated position so long as the velocity of flow passing therethrough is more than a predetermined velocity, both of said containers being in the form of cylinders and both said movable walls in the form of pistons, the weight of each said piston tending to move it to increase the volumetric content of its associated cylinder.

5. In a hydraulic system, in combination a container for liquid, a wall for said container movable inwardly and outwardly upon movement of liquid into and from the container, means to continuously communicate pressure of liquid from a source to the exterior side of said wall, means to continuously effect a predetermined pressure of constant value upon the wall to oppose the pressure of liquid effective on its exterior side, a valve operable to admit liquid from the source to the interior of said container, said valve and said wall being normally, entirely, operatively disassociated, means responsive to a definite predetermined outward movement of the wall to operate the valve, a duct for discharge of liquid from the container, a second container, a movable wall therefor, the interior of said second container communicating with a point in the flow of liquid passing said valve, which is so restricted as to effect a loss of pressure at such point commensurable with the velocity of flow passing the point, the exterior side of said wall communicating with a less restricted point in the path of the flow passing the valve, and means effective upon an inward movement of the second container wall to maintain the valve in operated position so long as the velocity of flow passing therethrough is more than a predetermined velocity, said point of restriction being closely adjacent the valve port.

6. In combination, a casing having a passage therethrough adapted to conduct a flow of fluid and a valve controlling the flow through the passage, a register, a register actuator, said actuator adapted to effect operation of the register at a rate corresponding to the rate of flow through the passage, means operable to effect opening of said valve responsive to an excess of pressure at the inlet end of the passage over that at the outlet end thereof, other means responsive to the rate of flow through the passage and means associated with said other means, adapted to effect upon an initial opening of the valve, continuous opening of the valve, substantially only for such a period as a predetermined rate of flow through the passage is exceeded.

7. In a water meter, in combination a valve adapted to prevent flows of water at low rates through the meter, a cylinder adapted to hold a storage supply of water and from which drafts of water at varying rates of draft may be supplied, a piston adapted to reciprocate in the cylinder responsive to the difference in pressures existing on its two sides, one of said pressures being derived from the water on the approach side of the valve, and the other pressure being derived from the water on the discharge side of the valve, and means operable by movements of said piston and adapted to open the valve to renew the supply of water in the cylinder, and means associated with said valve and operable responsive to the passage of water through the valve to hold the valve open independently of the subsequent movement of the piston.

8. In combination, a conduit for fluid flow, a meter in said conduit, a valve adapted to open and close the passageway through the conduit, means operated by the difference of pressure across said passageway to open said valve if a predetermined amount of difference of pressure is exceeded, fluid pressure operated means and means associated therewith dominated by the rate of flow through said passageway, to effect maintaining said valve in open passageway position so long as a predetermined rate of flow is exceeded.

9. A passageway for fluid flow, a fluid register, a register actuator in said passageway, a valve in said passageway, means operated by the difference of pressure across said passageway to open said valve if a predetermined amount of difference of pressure is exceeded, fluid pressure operated means and means associated therewith dominated by the rate of flow through said passageway to hold said valve open as long as a predetermined rate of said flow is exceeded, said valve movable against the direction of the flow therethrough when moving toward open position.

10. In a meter adapted to register the amount of water passed through it at varying rates including low rates of flow, a fluid operated registering mechanism, means operable to supply water through the registering mechanism in gulps of flow at rates sufficiently high as to be accurately registerable, a reservoir to receive the gulped water adapted to supply water continuously therefrom between gulps at unregisterable low rates of flow, a conduit conducting the gulped water to the reservoir, said conduit comprising a Venturi-like passage having a throat constriction, a by-pass conduit disposed in parallel about a portion of the first named conduit and terminating at one of its ends substantially at the said throat constriction and returning the by-passed flow to the first conduit thereat, and the register mechanism being disposed in the by-pass conduit.

11. In combination, a conduit for fluid flow, a valve adapted to open and close the passageway through the conduit, means operated by the difference of pressure across said passageway to open said valve if a predetermined amount of difference of pressure is exceeded, fluid pressure operated means and means associated therewith dominated by the rate of flow through said passageway to effect the maintaining of said valve in open passageway position so long as a predetermined rate of flow is exceeded.

12. A conduit comprising a passageway for fluid flow, a valve in said passageway, means operated by the difference of pressure across said passageway to open said valve if a predetermined amount of difference of pressure is exceeded, fluid pressure operated means and means associated therewith dominated by the rate of flow through said passageway to hold said valve open as long as a predetermined rate of said flow is exceeded, said valve movable against the direction of the flow therethrough when moving toward open position.

13. In combination, a conduit for fluid flow, a valve adapted to open and close the passageway through the conduit, means constantly exerting a substantially uniform effort tending to press the valve towards closed position, means operated by the difference of pressure across said passageway to open said valve if a predetermined amount of difference of pressure is exceeded, independent fluid pressure operated means, and means associated therewith dominated by the rate of flow through said passageway to maintain said valve in open passageway position so long as a predetermined rate of flow is exceeded.

14. A conduit comprising a passageway for fluid flow, a valve in said passageway, means constantly exerting a substantially uniform effort tending to press the valve towards closed position, means operated by the difference of pressure across said passageway to open said valve if a predetermined amount of difference of pressure is exceeded, independent fluid pressure operated means, and means associated therewith dominated by the rate of flow through said passageway to hold said valve open as long as a predetermined rate of said flow is exceeded, said valve movable against the direction of the flow therethrough when moving toward open position.

15. In a fluid metering system the combination with a fluid supplying and a fluid supplied system, of a fluid meter therefor, said supplied system having a reservoir capacity capable of holding more fluid at a higher pressure than at a lower pressure, a valve interposed between said supplying system and said supplied system adapted to prevent flow, means responsive to a predetermined difference of pressure on the two sides of the valve to open it, independent means responsive to flows through the valve in excess of a predetermined rate of flow, means rendered effective by said independent means to hold said valve opened as long as said predetermined rate is exceeded, and biasing means constantly exerting a pressure tending to close said valve to make it responsive to close again to stop flow therethrough.

16. In a fluid system and apparatus a valve controlling the flow of fluid through a passageway, means for maintaining the valve in an open position against the tendency of the flow of fluid through the passageway to close the valve said open position being predetermined by the rate of flow through the valve, said means including means for causing the flow to be accelerated at a portion of the passageway to decrease the pressure thereof at said portion, the valve being subjected to the pressure of the fluid approaching the passageway in a direction tending to open it and conduit means for applying the reduced pressure of the fluid at the accelerated portion to the valve in opposition to the opening pressure.

17. In a fluid conduit system, a fluid flow controlling valve, comprising a valve port and a valve element adapted to be seated on the port in the direction of flow controlled thereby, conduit means communicating to the valve element the pressure of fluid at the approach side of the valve element to exert an effort tending to unseat it, conduit means communicating to the valve element the pressure of fluid at its approach side to exert a greater effort tending to seat it, means for moving the valve element to unseat it to effect flow through the port, means responsive to the rate of flow to continuously effect a reduction of pressure in the conduit means communicating pressure to the valve element in the seating direction, and means biasing the valve element toward seated position by force sufficient to counterbalance a predetermined excess of the said opening fluid pressure over the said reduced seating fluid pressure.

18. In a fluid conduit system, a fluid flow controlling valve, comprising a valve port and a valve element adapted to be seated on the port in the direction of flow controlled thereby, conduit means communicating to the valve element the pressure of fluid at the approach side of the valve element to exert an effort tending to unseat it, conduit means commmunicating to the valve element the pressure of fluid at its approach side to exert a greater effort tending to seat it, means for moving the valve element to unseat it to effect flow through the port, means responsive to the rate of flow to continuously effect a reduction of pressure in the conduit means communicating pressure to the valve element in the seating direction, and means biasing the valve element toward seated position by force sufficient to counter-balance a predetermined excess of the said opening fluid pressure over the said reduced seating fluid pressure, said rate of flow responsive means comprising a restriction in the line of flow of the fluid.

19. In a fluid system, a valve therefor, a seat for the valve, a restriction in the line of flow controlled by the valve, said valve being positioned for movement against the direction of flow to opened position and subjected to fluid pressures exerted on its two sides, means biasing the valve toward closed position in the direction of flow independently of said fluid pressures, means associated with said valve comprising a fluid compartment and a movable wall therefor, said wall being adapted to move to exert an unseating effort upon the valve upon a reduction of pressure on its one side from that on its other side, and means continuously communicating said one side with said restriction.

20. In a water meter, a valve adapted to prevent small flows of water through the meter, a compartment in the meter adapted to contain a source of water to supply water at small rates of flow, comprising a cylinder, a piston adapted to reciprocate in the cylinder and responsive to the difference in pressure existing on its two sides, one of said pressures being derived from the water on the approach side of the valve and the other pressure being derived from the water on the discharge side of the valve, and means operable by movements of said piston adapted to open the valve to renew the supply of water in the compartment, means associated with said valve and operable during passage of water through the valve to hold the valve open independently of the subsequent position of the piston, said means comprising a passageway for fluid flowing through the valve, a restriction in the passageway, a chamber having a wall movable responsive to pressure in the chamber, the valve being adapted to be moved toward closed position in the direction of flow through the valve by movement of the wall in one direction, a fluid connection whereby the fluid pressure on the approach side of said restriction may be applied to the valve to tend to open it and hold it open and a connection between the restriction and the chamber whereby reduced pressure effected by flow through the restriction may be communicated to the chamber wall in opposition to the opening pressure on the valve.

21. In a water meter, a valve comprising a movable valve element adapted to prevent small flows of water through the meter, a compartment in the meter adapted to contain a source of water to supply water at small rates of flow comprising a cylinder, a piston adapted to reciprocate in the cylinder responsive to the difference in pressure existing on its two sides, one of said pressures being derived from the water on the approach side of the valve and the other pressure being derived from the water on the discharge side of the valve, and means operable by movements of said piston adapted to open the valve to renew the supply of water in the compartment, and means associated with said valve and operable during passage of water through the valve to hold the valve open independently of the subsequent position of the piston, said means comprising a passageway for fluid flowing through the valve, a restriction in the passageway, a chamber having a wall movable responsive to pressure in the chamber, the valve being adapted to be moved toward closed position in the direction of flow through the valve by movement of the wall in one direction, a fluid connection whereby the fluid pressure on the approach side of said restriction may be applied to the valve to tend to open it and hold it open and a connection between the restriction and the chamber through the movable element of the valve whereby reduced pressure effected by flow through the restriction may be communicated to the chamber wall in opposition to the opening pressure thereon.

22. In a fluid metering system, the combination with a fluid supplying and fluid supplied system, of a fluid meter therefor, said supplied system having a reservoir capacity of holding more fluid at a higher pressure in the supplied system than at a lower pressure therein, a valve interposed between said supplying system and said supplied system and adapted to prevent flow, means independently movable responsive to a predetermined difference of pressure on the two sides of the valve and adapted to operate the valve to open it and to subsequently permit an immediate closure of the valve from full open to closed position to stop flow therethrough upon the occurrence of a lower difference of pressure existing on its two sides.

23. In a fluid metering system, the combination with a fluid supplying and a fluid supplied system, of a fluid meter therefor, said supplied system having a reservoir capacity capable of holding more fluid at a higher pressure than at a lower pressure, a valve interposed between said supplying system and said supplied system adapted to prevent flow, means movable in response to a predetermined difference of pressure on the two sides of the valve to operate the valve to open it, independent means responsive to flow through the valve in excess of a predetermined rate of flow, means rendered effective by said independent means to hold said valve open as long as said predetermined rate is exceeded and biasing means constantly exerting a pressure tending to close said valve to make it responsive to close again to stop flow therethrough, and said valve adapted to close immediately independently of said movable means.

24. In a conduit system, the combination of a casing, a valve adapted to prevent small flows of water through the casing, a compartment in the casing adapted to contain a supply of water to supply water at small rates of draft, a movable member adapted to move responsive to the difference of pressure existing on its two sides, one of said pressures being derived from the water on the approach side of the valve and the other pressure being derived from the water on the discharge side of the valve, and means operable by movements of said member to effect an initial opening of the valve whereby the supply of water in the compartment will be renewed, other means responsive to flow through the valve at more than a predetermined velocity, means associated with said other means and operable to hold the valve open independently of the movement of the member until the rate of flow through the valve takes place at less than a predetermined rate, and a meter in the path of the flow through the valve.

25. In a conduit system, the combination of a casing, a valve adapted to prevent small flows of water through the casing, a compartment in the casing adapted to contain a supply of water to supply water at small rates of draft, a movable member adapted to move responsive to the difference of pressure existing on its two sides, one of said pressures being derived from the water on the approach side of the valve and the other pressure being derived from the water on the discharge side of the valve, and means operable by movements of said member to effect an initial opening of the valve whereby the supply of water in the compartment will be renewed, other means responsive to flow through the valve at more than a predetermined velocity, means associated with said other means and operable to hold the valve open independently of the movement of the member until the rate of flow through the valve takes place at less than a predetermined rate, and the valve opening against the direction of flow therethrough.

26. In a conduit system a fluid supplied system, a fluid supplying system, a reservoir, a valve adapted when in open position to permit supply fluid to flow from the supplying system to the reservoir and to the supplied system and when in closed position to stop flow from the supplying system, the reservoir having a wall portion of contractable and expansible bellows form, and adapted to supply fluid to the supplied system at small rates of flow when the valve is closed, means associated with the valve and responsive to the rate of fluid flow through the valve for holding the valve in open position to supply fluid to the supplied system and to the reservoir so long as said supply flow is at greater than a predetermined rate.

27. In a conduit system a fluid supplied system, a fluid supplying system, a reservoir, a valve adapted when in open position to permit supply fluid to flow from the supplying system to the reservoir and to the supplied system and when in closed position to stop flow from the supplying system, the reservoir having a wall portion of contractable and expansible bellows form, and adapted to supply fluid to the supplied system at small rates of flow when the valve is closed, means associated with the valve and responsive to the rate of fluid flow through the valve for holding the valve in open position to supply fluid to the supplied system and to the reservoir so long as said supply flow is at greater than a predetermined rate, and biasing means tending to move the bellows form wall portion into the condition of maximum reservoir content.

28. In a conduit system a fluid supplied system, a fluid supplying system, a reservoir, a valve adapted when in open position to permit supply fluid to flow from the supplying system to the reservoir and to the supplied system and when in closed position to stop flow from the supplying system, the reservoir having a wall portion of contractable and expansible bellows form, and adapted to supply fluid to the supplied system at small rates of flow when the valve is closed, means associated with the valve and responsive to the rate of fluid flow through the valve for holding the valve in open position to supply fluid to the supplied system and to the reservoir so long as said supply flow is at greater than a predetermined rate, and conduit means for communicating the supply fluid pressure to the bellows form wall portion to tend to move the same into the condition of minimum reservoir content.

29. In a conduit system a fluid supplied system, a fluid supplying system, a reservoir, a valve adapted when in open position to permit supply fluid to flow from the supplying system to the reservoir and to the supplied system and when in closed position to stop flow from the supplying system, the reservoir having a wall portion of contractable and expansible bellows form, and adapted to supply fluid to the supplied system at small rates of flow when the valve is closed, means associated with the valve and responsive to the rate of fluid flow through the valve for holding the valve in open position to supply fluid to the supplied system and to the reservoir so long as said supply flow is at greater than a predetermined rate, and biasing means tending to move the bellows form wall portion into the condition of maximum reservoir content, and conduit means for communicating the supply fluid to the bellows form wall portion to tend to move the same into the condition of minimum reservoir content.

30. In a water meter, a valve adapted to prevent small flows of water through the meter, a compartment in the meter adapted to contain a source of water to supply water at small rates of flow comprising a cylinder, a piston adapted to reciprocate in the cylinder responsive to the difference in pressure existing on its two sides, one of said pressures being derived from the water on the approach side of the valve, and the other pressure being derived from the water on the discharge side of the valve, and means operable by movement of said piston adapted to open the valve to renew the supply of water in the compartment, and means associated with said valve and operable during passage of water through the valve to hold the valve open independently of the subsequent movement of the piston, said means comprising an auxiliary piston for the valve and adapted to lift the valve upon a deficit of pressure on its upper side.

31. In a proportional flow meter mechanism, comprising a conduit having a Venturi passageway therein, a conduit forming a by-pass thereof, said by-pass conduit adapted to convey a flow proportional to the flow in the Venturi conduit, a register in the by-pass conduit, a valve for preventing flow from the discharge end of the Venturi conduit, a fluid storage chamber on the discharge side of the valve and adapted to receive, through the valve port, supplies of fluid stored for drafts therefrom at varying rates including low rates of draft, and a movable wall for said chamber movable responsive to the difference in pressure on each side of said wall resulting from a given amount of draft from the chamber, to effect opening of the valve.

32. In a proportional flow meter mechanism, comprising a conduit having a Venturi passageway therein, a conduit forming a by-pass thereof said by-pass conduit adapted to convey a flow proportional to the flow in the Venturi conduit, a register in the by-pass conduit, a valve for preventing flow from the discharge end of the Venturi conduit, a fluid storage chamber on the discharge side of the valve and adapted to receive, through the valve port, supplies of fluid stored for drafts therefrom at varying rates including low rates of draft, and a movable wall for said chamber movable, responsive to the difference in pressure on each side of said wall resulting from a given amount of draft from the chamber, to effect opening of the valve, and a pressure responsive device tending to hold the valve open after an initial opening by movement of said wall, independently of said wall, operable responsive to the reduction of pressure at the throat of the Venturi passageway relative to the pressure adjacent an end thereof.

33. In a conduit system, the combination of a casing, a valve adapted to prevent small flows of water through the casing, a compartment in the casing adapted to contain a supply of water to supply water at small rates of draft, a movable member adapted to move responsive to the difference of pressures existing on its two sides, one of said pressures being derived from the water on the approach side of the valve, and the other pressure being derived from the water on the discharge side of the valve, and means operable by movements of said member to effect an initial opening of the valve whereby the supply of water in the compartment will be renewed, other means responsive to flow through the valve at more than a predetermined velocity and means associated with said other means and operable to hold the valve open independently of the movement of the member until the rate of flow through the valve takes place at less than a predetermined rate.

34. In a water meter, a register, a register actuator, a valve adapted to prevent flows of water at low rates through the register, a compartment in the meter adapted to contain a supply of water to supply water at small rates of draft, a movable member adapted to move in alternate directions responsive to the difference of pressures existing on its two sides, one of said pressures being derived from the water on the approach side of the valve, and the other pressure being derived from the water on the discharge side of the valve, and means operable by movement of said member after a predetermined amount of movement in one direction to move said valve to effect an initial opening thereof whereby the supply of water in the compartment will be renewed, and to permit the valve to remain unmoved in open position during complete movement of the movable member in the other direction, said register actuator disposed in the path of the renewal supply of water to register the amount of water supplied to said compartment.

35. In a fluid metering system the combination with a fluid supplying and a fluid supplied system, of a fluid meter therefor, said supplied system having a reservoir capacity capable of holding more fluid at a higher pressure in the supplied system than at a lower pressure therein, a valve interposed between said supplying system and said supplied system and adapted to prevent flow, independently movable means responsive to a predetermined difference of pressure on the two sides of the valve to move the valve to open it and to permit an instantaneous closure of the valve from full open to closed position to stop flow therethrough upon the occurrence of a lower difference of pressure existing on its two sides.

In testimony whereof I hereunto affix my signature this 4th day of May, 1927.

GEORGE GOODELL EARL.